Nov. 8, 1966  M. MESNIERE  3,284,027
VTOL AIRCRAFT HAVING FREELY PIVOTED PROPULSION MEANS
Filed Jan. 5, 1965  6 Sheets-Sheet 1
Fig.1.
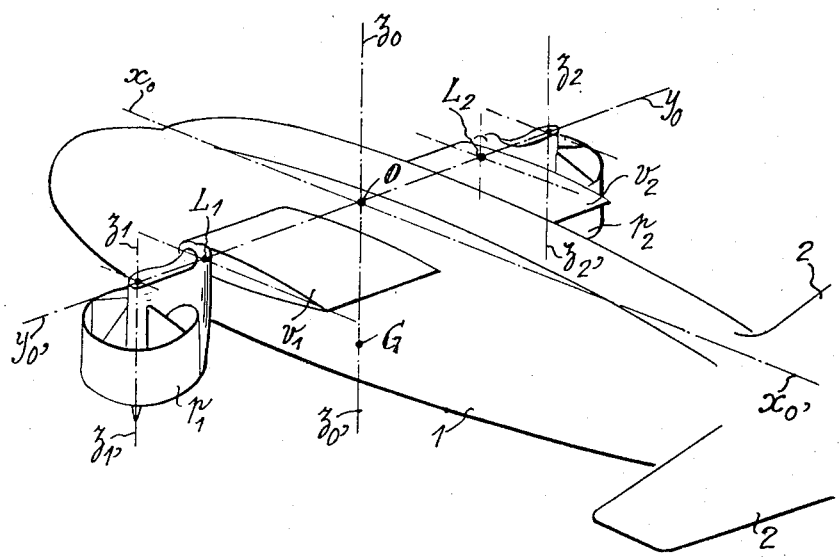
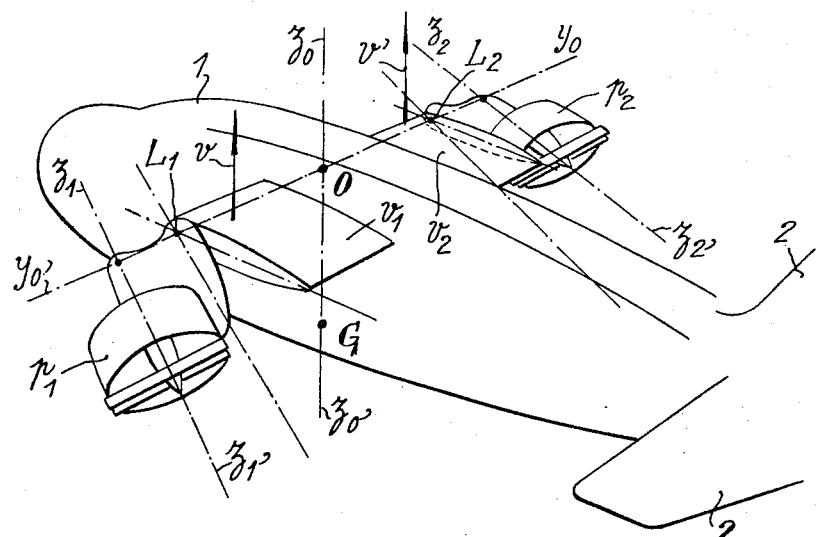
Fig.2.
Inventor
Marc Mesniere
By
[signature]
Attorney Fig. 3.
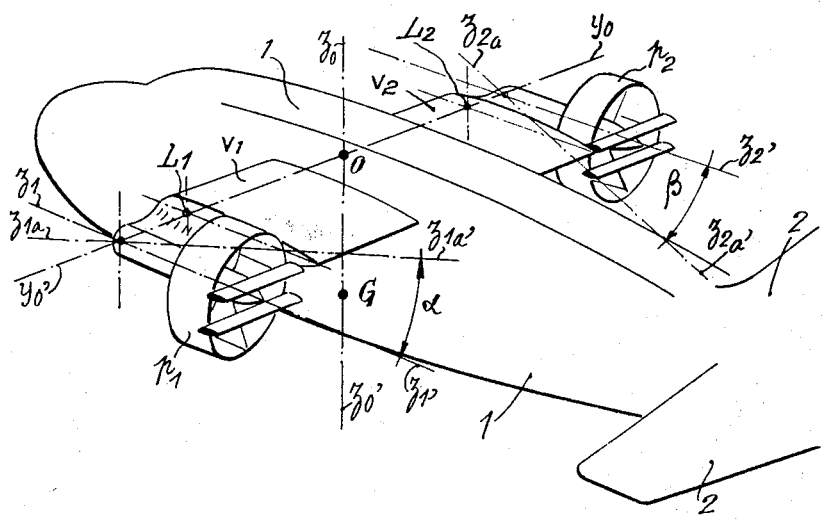
Fig. 5.
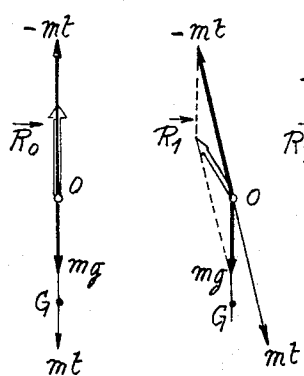
Fig. 7.
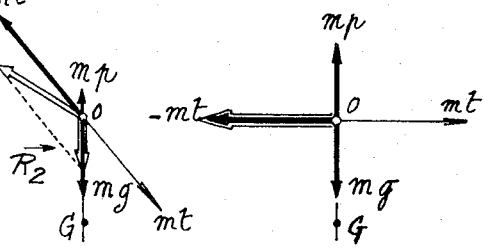
Fig. 4.   Fig. 6.
Inventor
Marc Mesniere
By
Karl W. Flocks
Attorney

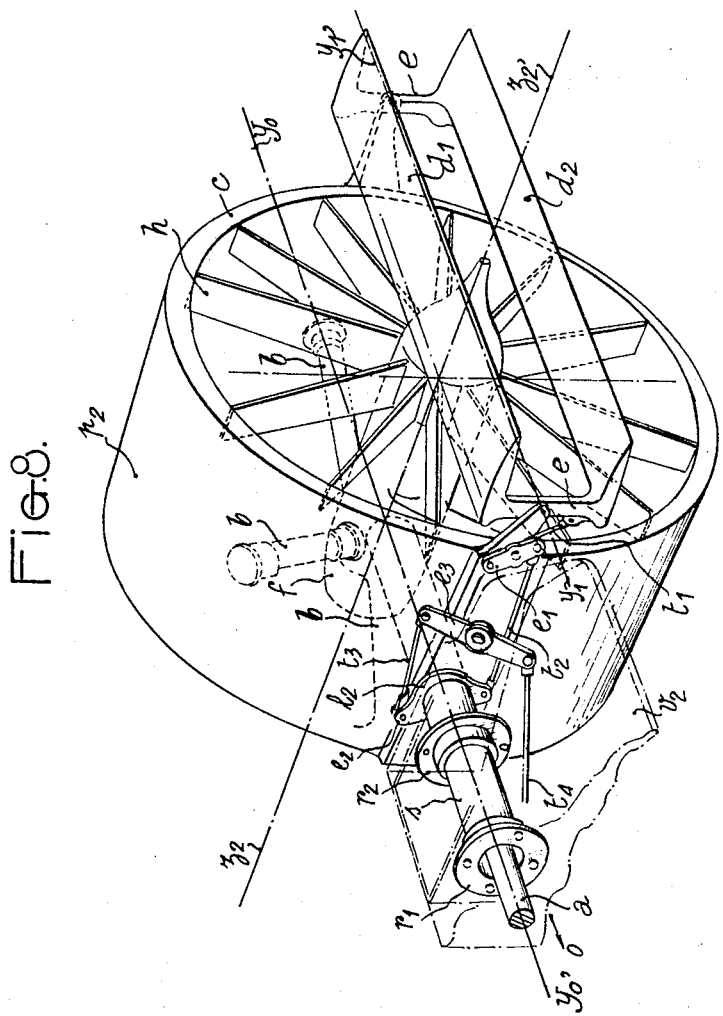

Inventor
Marc Mesniere
By
Kenn W Flocks
Attorney

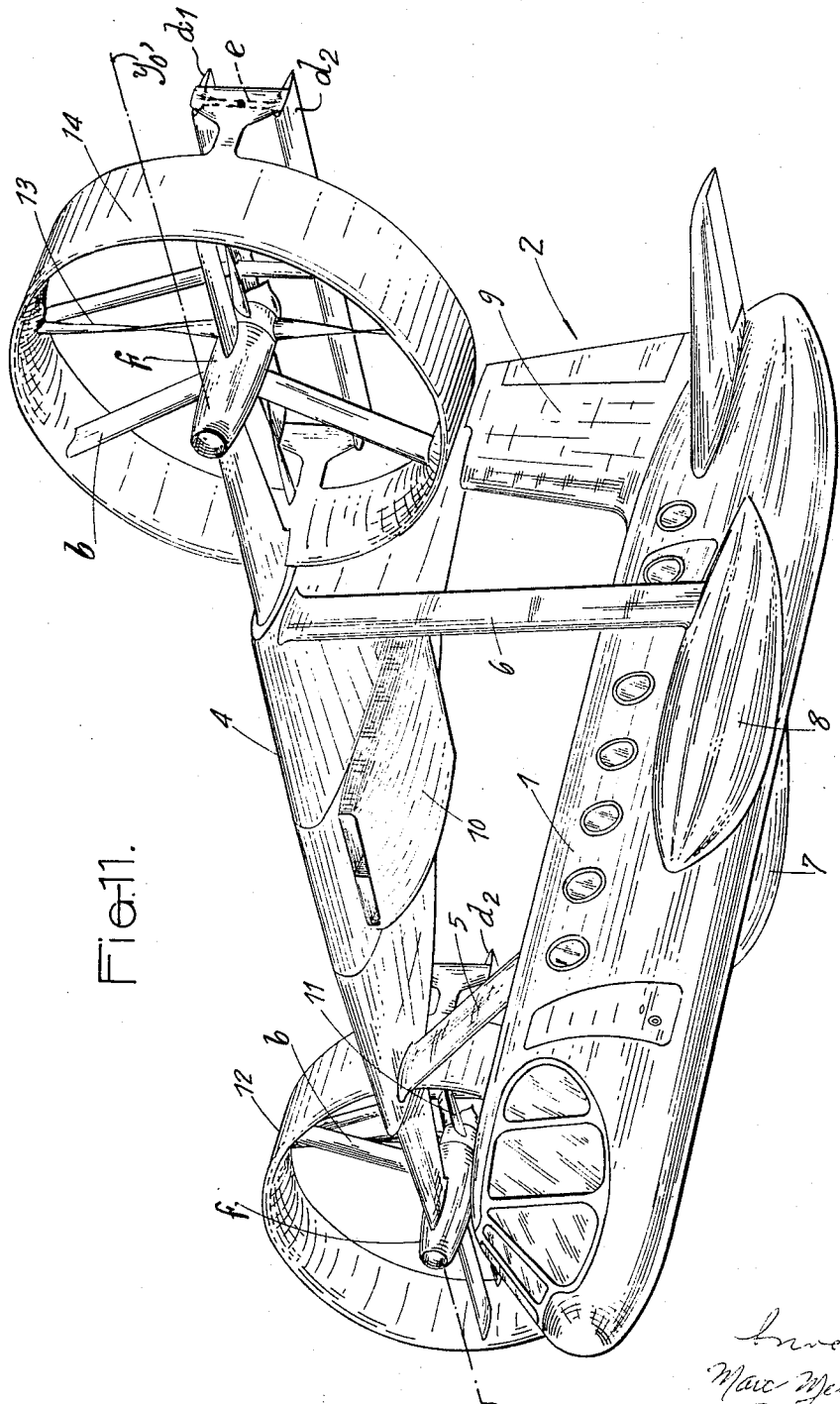

Nov. 8, 1966 M. MESNIERE 3,284,027
VTOL AIRCRAFT HAVING FREELY PIVOTED PROPULSION MEANS
Filed Jan. 5, 1965 6 Sheets-Sheet 6
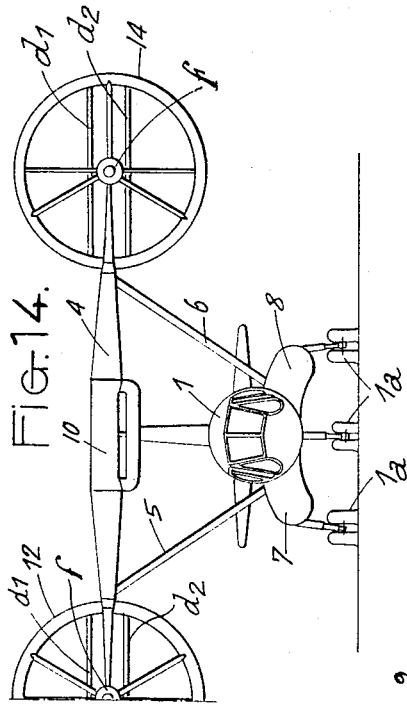
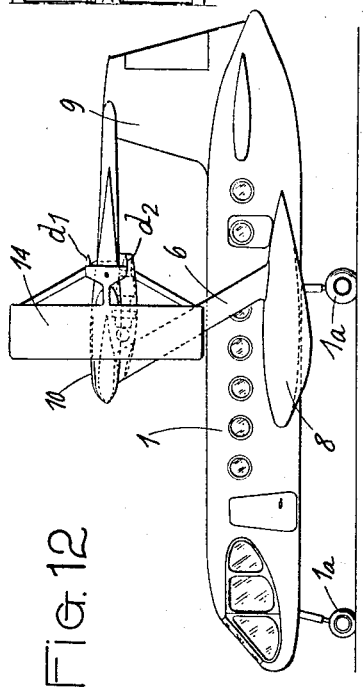
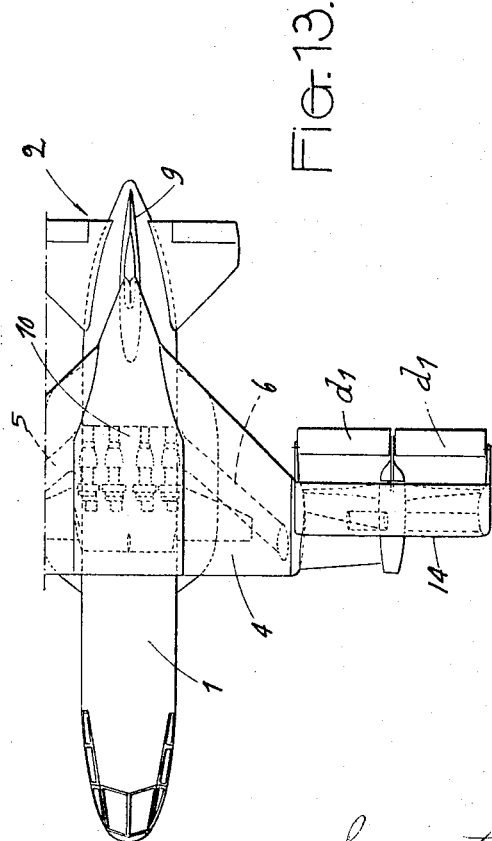
Inventor
Marc Mesniere
By
Karl W. Flocks
Attorney

United States Patent Office 3,284,027
Patented Nov. 8, 1966

3,284,027
VTOL AIRCRAFT HAVING FREELY PIVOTED PROPULSION MEANS
Marc Mesniere, Montrouge, France, assignor to Nord-Aviation Societe Nationale de Constructions Aeronautiques, Paris, France, a joint-stock company of France
Filed Jan. 5, 1965, Ser. No. 423,465
Claims priority, application France, Jan. 9, 1964, 959,850; June 12, 1964, 978,163
2 Claims. (Cl. 244—12)

The present invention relates to a method and the means for carrying it into effect, permitting the evolution of a flying machine with fixed wings during the various phases of flight, vertical, hovering, transitory and cruising.

At the present time, there exist several kinds of methods for attempting to resolve the problem in question.

Some of these utilize different engines for providing the necessary thrust during vertical flight and that necessary during horizontal flight.

Some utilize the same engines for providing the necessary thrust, both during vertical flight and during horizontal flight.

For this purpose, the engines employed in these methods are provided with orientatable discharge nozzles, or alternatively they are themselves pivoted.

In this latter kind of method, the flying machines comprise at least three propulsion units, in order that the conditions of equilibrium may be satisfied in all the phases of flight, by situating the center of gravity of the machine inside the polygon defined by the extreme positions of the resultant of the thrust as a function of the individual variations of the said thrusts.

The method according to the invention enables the problem to be resolved in a particularly simple and effective manner by utilizing only two propulsion units of conventional type, such as for example that of the faired propellor, associated with a mechanism adapted to modify the orientation of the said propulsion units by aerodynamic reaction, these two propulsion engines providing the flying machine with fixed wings on which they are mounted with the possibility of effecting all the phases of flight comprising vertical take-off, hovering flight, flight at cruising speed, and vertical landing.

The method according to the invention is essentially characterized by the fact that it consists: of mounting two identical propulsion units symmetrically with respect to the longitudinal plane of symmetry of the machine so that they can pivot freely about a common axis of rotation perpendicular to the said plane of symmetry and to the axes of thrust of the said propulsion units; of arranging the said axis of rotation in such manner that it is located substantially above the center of gravity of the machine; and of causing at will a pivotal movement of each of the propulsion units by aerodynamic reaction on at least one flap placed in its discharge flow and articulated on an axis perpendicular to the axis of thrust and parallel to the pivotal axis of the propulsion units, by the action of a control device.

In accordance with other characteristic features of the invention:

The control device for the flaps is arranged in such manner as to bring the flaps back automatically to zero incidence with respect to the discharge flow when the corresponding propulsion unit has pivoted through a certain angle previously determined.

The fixed-wing system of the flying machine is arranged in such manner that the position of the centers of the lifting thrust is as close as possible to the common transverse pivotal axis of the propulsion units.

The invention is also directed, by way of new industrial products, to flying machines with fixed wings which carry into effect the method described above.

Other characteristic features, advantages and particularities of the present invention will be brought out from the description which follows below with reference to the accompanying drawings which represent diagrammatically and simply by way of example and without limitation, one form of possible construction of a flying machine with fixed wings which carries the invention into effect.

In the drawings:

FIGS. 1, 2 and 3 show the machine in perspective respectively during the phases of vertical flight, transistory flight and horizontal flight.

FIGS. 4, 5, 6 and 7 are diagrams showing the balance of the dynamic forces applied to the machine during the different phases of flight.

FIG. 8 is a detail view to a larger scale, showing in perspective one type of propulsion unit or so-called faired propeller, utilized in one preferred form of embodiment of the invention.

FIG. 11 is a view in perspective of an aircraft to which the invention is applied.

FIGS. 12, 13 and 14 are respectively a side view, a view in plan and a front view of the aircraft of FIG. 11.

Figure 9:
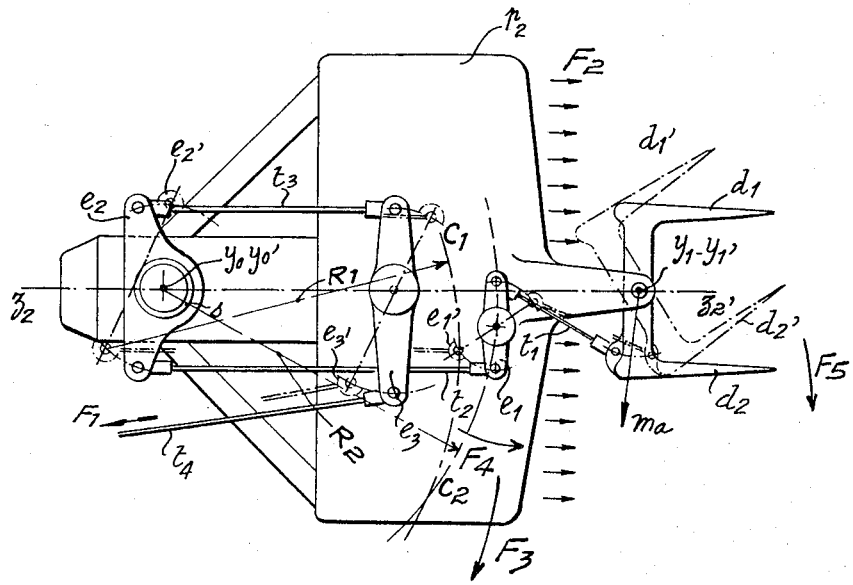
FIGS. 9 and 10 are explanatory diagrams showing in elevation the aerodynamic pivoting device for this propulsion unit, respectively at the beginning and at the end of the pivotal cycle.

Very generally, the flying machine according to the invention which is shown in FIGS. 1, 2 and 3, comprises essentially a cellule 1 with fixed wings $v_1$ and $v_2$; a rear tail unit 2, and two pivoted propulsion units $p_1$ and $p_2$.

More particularly, taking the case of FIG. 1 for which the propulsion units $p_1$ and $p_2$ give a vertical thrust from top to bottom, the axes $x_0$, $x'_0$ and $y_0$, $y'_0$ are by hypothesis horizontal, at right angles to each other and intersect at O. The axis $z_0$, $z'_0$, which is vertical by hypothesis, passes also through O and defines with $x_0$, $x'_0$, the plane of symmetry of the machine 1.

According to a feature of construction in accordance with the invention, the center of gravity of the machine is located on the axis $z_0$, $z'_0$ and below the axis $y_0$, $y'_0$, which is coincident with the pivotal axis of the propulsion engines $p_1$ and $p_2$. Furthermore, the respective axes of thrust $z_1$, $z'_1$ and $z_2$, $z'_2$ of the propulsion units are arranged at equal distances from the plane of symmetry defineed by the axes $x_0$, $x'_0$ and $z_0$, $z'_0$ and parallel to this plane.

The propulsion units $p_1$ and $p_2$ are arranged in such manner that by virtue of appropriate fairing and mechanisms, which will be dealt with in detail later, they are able, through the intermediary of the coupling points $l_1$ and $l_2$ situated on the axis $y_0$, $y'_0$ and at equal distances on each side of the point O, to pivot simultaneously or not simultaneously and to place themselves in any position between two limits defined by the vertical position of FIG. 1 and the substantially horizontal position of FIG. 3.

The conditions of vertical or hovering flight of the machine shown in FIG. 1 are indicated diagrammatically in FIG. 4, in which it has been assumed for the sake of simplicity that the orientation and the thrust of the propulsion units $p_1$ and $p_2$ were identical. It can be seen that the machine is subjected to an upward movement when the resultant $\vec{R}_0$ of the reaction $-mt$ (of the thrust $mt$ of the propulsion units) is not zero with the force of gravity $mg$ and is directed upwards following a vertical direction. The downward movement is defined by the reversal of the direction of the resultant $\vec{R}_0$, whereas the machine is in stationary flight when the resultant $\vec{R}_0$ is zero because of the equality of the forces $-mt$ and $mg$.

It is easy to see from FIGS. 5, 6 and 7 that the point $o$ represents the point of application of the forces $-mt$ and $mg$, and that this point is located on the pivotal axis $y_0$, $y'_0$.

For aerodynamic reasons which are explained later, the centers of thrust $v$ and $v'$ of the wing elements $v_1$ and $v_2$ are as close as possible to the axis $y_0$, $y'_0$.

In order to effect a transitory flight, it is necessary to cause the propulsion units $p_1$ and $p_2$ to pivot as has been shown in FIG. 2. The movement of the machine can be effected, without lift from the wing system, as indicated in FIG. 5 or with lift from the wing system as indicated in FIG. 6, it being understood that in all cases the initiation of a movement of translation assumes the appearance of a resultant $\vec{R}_1$ (FIG. 5) or $\vec{R}_3$ (FIG. 6). This resultant can only be obtained by a more or less pronounced inclination to the vertical of the thrust reaction $-mt$, the thrusts $mt$ of the propulsion units $p_1$ and $p_2$ being again assumed to be equal and parallel.

It is known that such a resultant can only be defined in magnitude, sense and direction by the magnitude and the inclination of the thrust reaction $-mt$ and by the magnitude of $mg$ or of the resultant $\vec{R}_2$ which is substituted for it during the appearance of the lifting force $mp$. In this latter case, the centers of thrust $v$, $v'$ of the wings $v_1$ and $v_2$ are such that the point of application of the lifting force has a tendency to coincide with the point O, in order to prevent the appearance of a dangerous couple.

The cruising flight of the machine as shown in FIG. 3 is reduced to the case of flight of a conventional machine. In this case (see FIG. 7) the lifting force $mp$ being equal and opposite to the force of gravity $mg$, the resultant at O is zero. The thrust reaction $-mt$ alone produces the movement of the machine.

It will be understood that all the essentials for piloting are made possible with the method according to the invention by:

A voluntary action on the value of the inclination of the axes $z_1$, $z'_1$ and $z_2$, $z'_2$ of the pro propulsion units $p_1$ and $p_2$, such that these axes can pivot independently of each other and can come, for example (see FIG. 3), one into the position $z_{1a}$, $z'_{1a}$ after having pivoted through a positive angle $\alpha$ and the other into the position $z_{2a}$, $z'_{2a}$ after having pivoted through a negative angle $\beta$ or vice-versa;

A voluntary action which permits the modification, independently of each other, of the thrusts of the propulsion units $p_1$ and $p_2$.

In order to ensure the inclination of the propulsion units, it could a priori have been desired to have available as in certain known prior systems, jacks of such a kind that the resultant action of these jacks tends to create a couple about the point O by virtue of a judicious positioning of the points of application of the representative line of force of these jacks on the vectors $mg$ and $mt$.

Now, it has been shown that the equilibrium of such a system is very delicate due to the very fact that the desired points of application have not been fixed by definition.

According to the invention, the inclination of the propulsion units is obtained in a particularly simple and effective manner by the utilization of a means which employs the aerodynamic reaction of flaps with a variable incidence.

There will now be described by way of example only and without limitation, one possible form of construction of such a control device for the pivotal movement of a propulsion unit, constituted in the present case by a faired propeller.

For this purpose, reference will be made to FIGS. 8, 9 and 10, relating to the propulsion unit $p_2$ only, it being understood that the other propulsion unit $p_1$ is mounted and actuated in the same manner.

The unit $p_2$ pivoting about the axis $y_0$, $y'_0$ is constituted by a multi-blade propeller $h$ with variable pitch, mounted on the axis $z_2$, $z'_2$ (on a streamlined barrel casing $f$ which is coupled by arms $b$ to a fairing $c$). The propeller receives its motion through the intermediary of a shaft $a$ placed in the interior of a tube $s$ rigidly fixed to $p_2$ and pivoting in bearings $r_1$, $r_2$ which are in turn fixed to the wing element $v_2$.

Rigidly fixed to this pivoted unit $p_2$, a set of two flaps $d_1$ and $d_2$ coupled rigidly together by cross braces $e$, is arranged in the discharge flux of the propeller. The two flaps which form a single unit are articulated on a common axis $y_1$, $y'_1$ parallel to the pivotal axis $y_0$, $y'_0$ and supported by bearings rigidly fixed to the fairing $c$.

In accordance with an essential feature of the invention, a mechanism is provided which enables the set of flaps $d_1$, $d_2$ to be pivoted at will on the axis $y_1$, $y'_1$ so as to subject it to the aerodynamic action of the discharge flow of the propeller and to cause the pivotal movement of the unit $p_2$, the said mechanism being furthermore designed in such manner that when the unit $p_2$ pivots, the flaps $d_1$, $d_2$ gradually and automatically return to zero incidence when the unit $p_2$ has pivoted through the desired angle.

The mechanism in question is essentially constituted by three crank-arms $l_1$, $l_2$, $l_3$, freely articulated on three axes parallel to $y_0$, $y'_0$ which are respectively fixed to the unit $p_2$ (axis of the crank-arm $l_1$), to the tube $s$ (axis of the crank-arm $l_2$) and to the wing system $v_2$ (axis of the crank-arm $l_3$).

In addition, a tie-rod $t_1$ couples the set of flaps $d_1$, $d_2$ to the crank-arm $l_1$; a tie-rod $t_2$ connects the crank-arm $l_1$ to the crank-arm $l_2$; a tie-rod $t_3$ couples the crank-arm $l_2$ to the crank-arm $l_3$; and a tie-rod $t_4$ couples the crank-arm $l_3$ to an appropriate control means of any kind, hydraulic, pneumatic, etc. (not shown), actuated by the pilot or by remote-control.

The operation of the pivoting control device is as follows:

Assuming that the various constituent parts of the whole of the propulsion unit $t_2$ are in the relative positions shown in FIG. 9, corresponding to the cruising flight of FIG. 3, and that it is desired to pivot this unit through an angle $\beta$ so as to bring the axis $z_2$, $z'_2$ of the propulsion unit $p_2$ into the position $z_{2a}$, $z'_{2a}$, also shown in the same FIG. 3 and to which FIG. 10 corresponds, the procedure is as follows:

By means of the control device (not shown) which has been referred to above, the rod $t_4$ is actuated in the direction $F_1$ through a distance corresponding to the value of the desired pivotal angle. This has the result to cause the pivoting, through the intermediary of the tie-rods $t_3$, $t_2$ and $t_1$, of the crank-arms $l_3$, $l_2$, $l_1$ together with the set of flaps $d_1$, $d_2$, so as to bring these into the respective positions shown in dotted lines, $l'_3$, $l'_2$, $l'_1$ and $d'_1$, $d'_2$.

From this moment, the discharge flux of the propulsion unit $p_2$, shown diagrammatically by the series of arrows $F_2$, impinges on the flaps occupying the position $d'_1$, $d'_2$, the incidence of which is no longer zero, which generates by aerodynamic reaction a force $ma$ directed downwards.

This force will rotate the unit $p_2$ in the direction $F_3$ about the pivotal axis $y_0$, $y'_0$.

Figure 10:
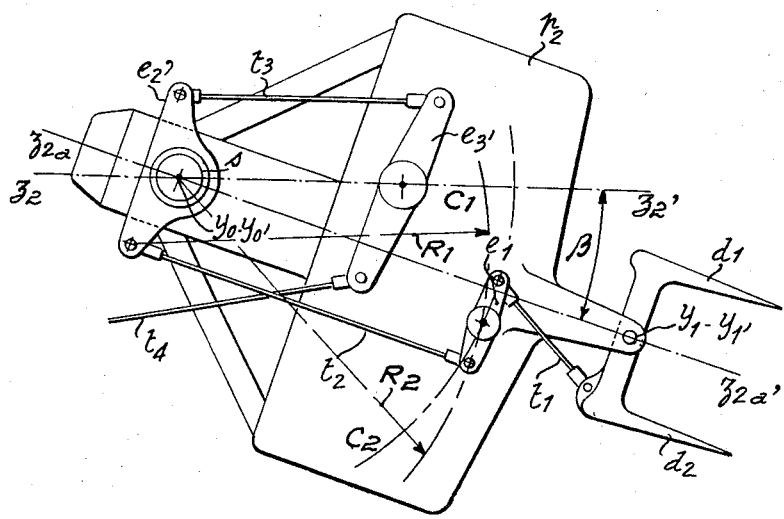

It is immediately apparent from a study of FIGS. 9 and 10, that by reason of the arrangement of the mechanism the crank-arms $l_2$ and $l_3$ remain in unchanged relative positions during the pivotal movement of the propulsion unit $t_2$ in the direction $F_3$; whereas the crank-arm $l_1$ rotates in the direction $F_4$, since its base is compelled to follow a circumference $C_1$ of radius $R_1$ and its axis a circumference $C_2$ of radius $R_2$.

This pivotal movement of the crank-arm $l_1$ has the result of causing the set of flaps $d_1$, $d_2$ to rotate in the direction $F_5$. As soon as the said flaps have reached the position at which their incidence is zero with respect to the discharge flux of the propulsion unit $p_2$, the latter will again have reached a stable position of equilibrium.

In other words, it can thus be seen that the unit $p_2$, as soon as it is unbalanced by the couple created by the force $ma$, will seek a new position of stable equilibrium and this will be found when the said force *ma* is brought to zero by a zero incidence of the flaps $d_1$, $d_2$ with respect to the discharge flux of the propulsion unit.

This new position of equilibrium will remain stable as long as the said flaps maintain zero incidence.

It is furthermore apparent that the degree of movement may be as large as can be desired, and that the pivotal movement of the propulsion unit can take place in either the positive or negative direction, since in order to do this it is only necessary to actuate the control rod $t_4$ in the direction $F_1$ or in the opposite direction to $F_1$.

The piloting of a flying machine according to the invention is effected, for pitching, by symmetrical operation of the flaps located in the discharge of the propulsion units, while the piloting in the rolling direction and yawing is obtained by variation of the thrust of the propulsion units and actuation of the rudders.

In the form of embodiment shown in FIGS. 11 to 13, the machine comprises a fuselage 1, a landing gear 1a and a tail unit 2, all these parts being of a conventional type. The fixed wing system 4, without dihedral, the leading edge of which is straight and the trailing edge has the form of a V, the point of the V being directed towards the rear, is placed above the fuselage 1 and is coupled to the fuselage by masts 5 and 6 through the intermediary of section elements 7 and 8 rigidly fixed to the said fuselage. It is also built into and fixed at the rear point of the V on the tail-fin 9.

The propulsion set 10 is constituted by four turbo-prop engines joined together in two independent units, one for driving a propeller 11 housed in a fairing 12, the other for driving a propeller 13 housed in the fairing 14. Each of these fairings can turn freely about the axis of rotation or pivotal movement $y_0$, $y'_0$ perpendicular to the longitudinal plane of symmetry of the flying machine, their positions being controlled by an aerodynamic control flap $d_1$, $d_2$ mounted in the discharge flow of the propellers 11 and 13.

For the purpose of simplicity, the conventional means employed for producing the rotation of the propeller, the control of its speed and the variation of its pitch have been deliberately omitted, it being furthermore understood that propulsion units of any other type than that taken by way of example in the description could just as well be utilized without thereby departing from the scope of the invention.

Similarly, it is quite clear that the form of construction of the flap control device which has been shown in the drawings and described above, has only been taken purely by way of explanation and not in any limitative sense, and with the sole object of making the principle of the invention clearly understood, and that all devices adapted to attain the same result by utilizing equivalent means for acting on flaps of any shape and in any number located in the discharge flux of a propulsion unit would still remain within the scope of the invention.

I claim:
1. A flying machine with a fixed wing system capable of maneuvering during the various phases of flight, vertical, hovering, transitory and horizontal, the said flying machine having two identical propulsion units arranged symmetrically with respect to its longitudinal plane of symmetry, the said propulsion units being freely articulated on a common pivotal axis perpendicular to the said plane of symmetry and to the axes of thrust of the said propulsion units in which:

an arrangement of the whole of the machine such that said pivotal axis is located before the intake side of the propulsion units;

at least one flap located in the discharge flow of each of the propulsion units, the said flap being articulated on an axis which is perpendicular to the axis of thrust and parallel to the pivotal axis of the propulsion unit;

and control means for each of the propulsion units, permitting the incidence of the said flap to be varied at will with respect to the discharge flow so as to cause the pivotal movement of the corresponding unit by aerodynamic reaction.

2. A flying machine in accordance with claim 1, in which the control means for the said flaps comprises:

shafts coupled to the fixed wing system of the flying machine;

two crank-arms pivoting on said shafts;

a shaft coupled to the propulsion unit;

a crank-arm pivoting on said shaft;

a control member of any appropriate type;

and rigid couplings arranged respectively between one of the crank-arms coupled to the wings and said control member; between this crank-arm and the second crank-arm coupled to the fixed wing system; between this second crank-arm and the crank-arm coupled to the propulsion unit, and finally between this latter crank-arm and the flap located in the discharge flow of the corresponding propulsion unit, whereby the said flaps are progressively and automatically brought back to zero incidence with respect to the discharge flow, as and when the propulsion unit pivots and has reached the desired angle of rotation, which is pre-determined by the initial angle of incidence given expressly to the said flap.

References Cited by the Examiner
UNITED STATES PATENTS
3,039,719 6/1962 Platt _____ 244—7
FOREIGN PATENTS
437,447 10/1935 Great Britain.

MILTON BUCHLER, *Primary Examiner.*

L. C. HALL, *Assistant Examiner.*